(12) United States Patent
Suzuki

(10) Patent No.: US 9,231,487 B2
(45) Date of Patent: Jan. 5, 2016

(54) DC POWER SOURCE DEVICE AND POWER CONVERSION METHOD USING A SINGLE DRIVE POWER SUPPLY

(75) Inventor: Yasuji Suzuki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 195 days.

(21) Appl. No.: 14/116,686

(22) PCT Filed: May 1, 2012

(86) PCT No.: PCT/JP2012/061556
§ 371 (c)(1),
(2), (4) Date: Nov. 8, 2013

(87) PCT Pub. No.: WO2012/153676
PCT Pub. Date: Nov. 15, 2012

(65) Prior Publication Data
US 2014/0063860 A1    Mar. 6, 2014

(30) Foreign Application Priority Data

May 10, 2011   (JP) ................................. 2011-104850

(51) Int. Cl.
*H02M 3/335*    (2006.01)
*H02M 1/36*     (2007.01)
(Continued)

(52) U.S. Cl.
CPC ............ *H02M 3/33576* (2013.01); *H02M 1/36* (2013.01); *H02M 1/4216* (2013.01);
(Continued)

(58) Field of Classification Search
CPC .. H02M 7/219; H02M 2001/0048–2001/0058; H02M 2001/007; G06F 1/70
USPC .............. 323/238, 357–359, 901; 363/17, 37
See application file for complete search history.

(56) References Cited

U.S. PATENT DOCUMENTS 5,767,591 A * 6/1998 Pinkerton ........................ 307/64
5,982,645 A * 11/1999 Levran et al. ................... 363/37
(Continued)

FOREIGN PATENT DOCUMENTS

JP    06 284501    10/1994
JP    11 69777     3/1999
(Continued)

OTHER PUBLICATIONS

International Search Report Issued Aug. 14, 2012 in PCT/JP12/061556 Filed May 1, 2012.
(Continued)

*Primary Examiner* — Jessica Han
*Assistant Examiner* — David A Singh
(74) *Attorney, Agent, or Firm* — Oblon, McClelland, Maier & Neustadt, L.L.P.

(57) ABSTRACT

FETs disposed in a DC/DC converter are each driven by a drive transformer. A voltage from a single drive power supply disposed in common for the FETs is divided into positive and negative biases to be applied to the FETs, and an operational state of the FETs is detected based on voltage signals. A sequence circuit turns on an input from a three-phase AC power supply by driving a relay circuit at a time point when it is confirmed that the FETs have normally started stable ON/OFF operation, and drives a power factor improvement circuit, which converts AC voltage from the three-phase AC power supply into a DC voltage by simultaneously performing full-wave rectification and power factor improvement.

3 Claims, 5 Drawing Sheets

(51) Int. Cl.
  *H02M 7/219* (2006.01)
  *H02M 1/42* (2007.01)
  *G05F 1/70* (2006.01)
  *H02M 1/00* (2007.01)

(52) U.S. Cl.
  CPC ........ *H02M1/4258* (2013.01); *H02M 3/33592* (2013.01); *H02M 7/219* (2013.01); *G05F 1/70* (2013.01); *H02M 1/4208* (2013.01); *H02M 1/4233* (2013.01); *H02M 1/4241* (2013.01); *H02M 2001/007* (2013.01); *H02M 2001/0054* (2013.01); *Y02B 70/126* (2013.01); *Y02B 70/1475* (2013.01)

(56) References Cited

U.S. PATENT DOCUMENTS

| | | | | |
|---|---|---|---|---|
| 6,385,057 | B1* | 5/2002 | Barron | 363/17 |
| 2002/0188383 | A1* | 12/2002 | Elek et al. | 700/297 |
| 2003/0231009 | A1* | 12/2003 | Nemoto et al. | 323/276 |
| 2005/0013143 | A1* | 1/2005 | Kim et al. | 363/20 |
| 2006/0214513 | A1* | 9/2006 | Tan et al. | 307/64 |
| 2009/0086520 | A1* | 4/2009 | Nishimura | 363/133 |
| 2010/0232180 | A1* | 9/2010 | Sase et al. | 363/17 |
| 2011/0133573 | A1* | 6/2011 | Ratnaparkhi et al. | 307/154 |

FOREIGN PATENT DOCUMENTS

| | | |
|---|---|---|
| JP | 2004 242475 | 8/2004 |
| JP | 2006 187137 | 7/2006 |
| JP | 2007 006658 | 1/2007 |
| JP | 2007-325332 | 12/2007 |
| JP | 2008 125312 | 5/2008 |
| JP | 2010-35390 | 2/2010 |
| JP | 2011 035957 | 2/2011 |

OTHER PUBLICATIONS

Office Action mailed Oct. 27, 2015 in Japanese Application No. 2014-239865 (w/English translation).

* cited by examiner

BACKGROUND ART

DC POWER SOURCE DEVICE AND POWER CONVERSION METHOD USING A SINGLE DRIVE POWER SUPPLY

TECHNICAL FIELD

The present invention relates to a DC power source device (hereinafter referred to as a DC power supply device) and a power conversion method. In particular, the present invention relates to a DC power supply device and a power conversion method for converting an AC power supply into a DC power supply.

BACKGROUND ART

As an application field of the DC power supply device, which is supplied with AC power as an input, there is a power supply system for a ship or an airplane, for example. This type of a power supply system uses a three-phase generator as a primary power supply, which is supplied with three-phase AC power as an input so as to output a relatively high AC voltage such as AC 200 to 440 Vrms. In order to prevent harmonic ripple current generated when the primary power supply is full-wave rectified from badly affecting the primary power supply or other devices sharing the primary power supply, it is required to provide a DC power supply device capable of performing AC/DC conversion with very low harmonic ripple and high power factor.

In this case, there is known a related art DC power supply device used in the power supply system for a ship or an airplane, in which a three-phase power factor improvement circuit is constructed of a three-phase bridge circuit connected to the three-phase generator via a choke coil and a three-phase power factor control circuit for controlling the three-phase bridge circuit, and a DC/DC converter for stepping down voltage is connected to the latter stage.

The three-phase bridge circuit is a switching circuit in which three sets of series circuits of two switching elements, to which diodes are respectively connected in anti-parallel, are connected in parallel to both ends of an output capacitor, and series connection nodes of the individual series circuits are connected to corresponding phases of the three-phase generator via choke coils, respectively. The three-phase bridge circuit works as a three-phase power factor control circuit utilizing three-phase full-wave rectification by the six diodes, and a step-up circuit including the choke coils of individual phases, the six switching elements, and the six diodes.

The three-phase power factor control circuit detects AC voltage and AC current supplied to the three-phase bridge circuit via the choke coils and performs dq conversion of the AC voltage and the AC current. Then, the three-phase power factor control circuit simultaneously performs calculation for power factor compensation control and current control, and calculation for voltage control based on an output voltage from the three-phase bridge circuit to the DC/DC converter, so as to determine an ON/OFF ratio of each switching element of the three-phase bridge circuit.

Thus, the three-phase bridge circuit directly performs high speed switching of the three-phase AC voltage at a switching frequency of the ON/OFF ratio controlled in synchronization with the three-phase AC voltage. Therefore, control is performed so that current having the same phase as an input voltage waveform flows in a sine wave manner, and thus three-phase full-wave rectification and three-phase power factor improvement utilizing step-up operation are simultaneously performed.

In addition, as to a DC/DC converter for converting a DC voltage into a voltage that can be used by a load device, a DC/DC converter having small size and light weight with small loss is required, and hence a switching DC/DC conversion circuit is common. However, in a power semiconductor element using silicon (hereinafter referred to as Si), reductions of on-resistance and saturation voltage are close to limitations technically, and hence higher efficiency of the DC/DC converter is also in a saturated state. As a result of studying wide-bandgap semiconductors in recent years, a field effect transistor (FET) using gallium nitride (hereinafter referred to as GaN) and a switching device using silicon carbide (hereinafter referred to as SiC), which are capable of high speed switching and have low on-resistance, high withstand voltage, and large current, have started to be used. It is known in general that if an FET using GaN or SiC is used, switching loss can be reduced so that a DC/DC converter having a smaller size and higher efficiency can be provided.

However, most metal-oxide-semiconductor field effect transistors (MOS FETs) made of GaN or SiC, which are being available currently, have a low threshold value of a gate voltage, and hence they may become the on state when the gate voltage is not applied. Therefore, in order to drive the MOS FET made of GaN or SiC, it is necessary to use two power supplies including a positive power supply and a negative power supply, and a driving circuit that applies a positive voltage to the gate of the FET by the positive power supply when turning on the FET, and applies a negative voltage to the gate of the FET by the negative power supply when turning off the FET.

Further, in a case where a MOS FET made of GaN or SiC having possibility to be turned on when the gate voltage is not applied is used in the power supply circuit, the voltage supplied to the DC/DC converter may be short-circuited normally. Therefore, as described in Patent Literature 1, for example, there is a problem in that it is necessary to consider a protection method such as disposing a protection element or a relay for preventing the short circuit.

As described above, in the conventional technique, in a case where a MOS FET made of GaN or SiC, which is capable of high speed switching and has a low on-resistance, a high withstand voltage, and a large current, is used in the power supply circuit, it is necessary to use another power supply for always applying a negative voltage to the gate of the FET even in the state where the power supply circuit is stopped. Therefore, in a full-bridge type DC/DC converter used in a power supply circuit having a large output power, it is necessary to use two sets of power supplies capable of outputting both the positive and negative voltages as the power supply for driving the two FETs connected to the higher voltage. In addition, it is necessary to use at least one set of power supplies capable of outputting both the positive and negative voltages as the power supply for driving the two FETs connected to the lower voltage. As a result, it is necessary to use in total three sets of power supplies capable of outputting both the positive and negative voltages. Therefore, the circuit becomes complicated, and hence it is difficult to downsize the DC power supply device.

Therefore, there is proposed a method described in Patent Literature 2, in which another power supply is used so that a negative gate voltage can be applied to only the FET on the lower voltage side even in the state where the power supply is stopped.

CITATION LIST

Patent Literature

[PTL 1] JP 2696270 B
[PTL 2] JP 2004-242475 A

SUMMARY OF INVENTION

Technical Problem

However, the power supply having the structure illustrated in Patent Literature 2 also needs another negative power supply to start before applying the input voltage and another power supply for operating a control system. Therefore, there is a problem in that it is difficult to realize downsizing, and in addition the driving circuit becomes complicated so that a scale of the power supply circuit becomes larger.

In addition, when the output voltage of the three-phase generator used in a power supply system for a ship or an airplane is improved in power factor by the three-phase bridge circuit and is rectified and smoothed, the output voltage becomes a very high voltage such as 600 V to 800 V. Therefore, there is a problem in that the power supply for driving the FET is also required to have a high withstand voltage, and further the entire circuit becomes a larger scale.

The present invention has been made to solve the above-mentioned problems, and it is an object of the present invention to provide a DC power supply device and a power conversion method, which can maintain a stable OFF state when the FET is turned off by a single power supply without a negative power supply that has been necessary for turning off the FET in the conventional structure, so as to prevent complication of the circuit and to achieve a lower cost and a smaller size of the circuit.

Solution to Problems

According to the present invention, there is provided a DC power supply device, including: a power factor improvement circuit for converting an AC voltage from an AC power supply into a DC voltage by performing full-wave rectification while improving a power factor; a DC/DC converter for converting the DC voltage from the power factor improvement circuit into a low DC voltage to be supplied to a load; a relay circuit disposed between the AC power supply and the power factor improvement circuit so as to switch between on and off of an input from the AC power supply; and a sequence circuit connected to the power factor improvement circuit, the DC/DC converter, and the relay circuit, in which: the DC/DC converter includes: a plurality of FETs connected to each other to form a full bridge; a plurality of FET driving circuits respectively connected to the plurality of FETs, for driving the plurality of FETs; a single drive power supply connected in common to all the plurality of FET driving circuits; and a phase control circuit for outputting, to the plurality of FET driving circuits, a control signal for controlling on and off phases of the plurality of FETs; each of the plurality of FET driving circuits divides an output voltage from the single drive power supply into positive and negative biases (or positive and negative voltages) to apply them to corresponding one of the plurality of FETs in accordance with the control signal from the phase control circuit; the sequence circuit detects an operational state of the DC/DC converter and outputs a drive signal for operating the relay circuit and the power factor improvement circuit at a time point when it is confirmed that the plurality of FETs of the DC/DC converter have started normal operation under control by the phase control circuit; and the relay circuit and the power factor improvement circuit are turned on in accordance with the drive signal from the sequence circuit.

Advantageous Effects of Invention

According to the present invention, the DC power supply device includes: the power factor improvement circuit for converting an AC voltage from the AC power supply into a DC voltage by performing full-wave rectification while improving a power factor; the DC/DC converter for converting the DC voltage from the power factor improvement circuit into a low DC voltage to be supplied to the load; the relay circuit disposed between the AC power supply and the power factor improvement circuit so as to switch between on and off of the input from the AC power supply; and the sequence circuit connected to the power factor improvement circuit, the DC/DC converter, and the relay circuit. The DC/DC converter includes: the plurality of FETs connected to each other to form a full bridge; the plurality of FET driving circuits respectively connected to the plurality of FETs, for driving the plurality of FETs; the single drive power supply connected in common to all the plurality of FET driving circuits; and the phase control circuit for outputting, to the plurality of FET driving circuits, a control signal for controlling on and off phases of the plurality of FETs. Each of the plurality of FET driving circuits divides an output voltage from the single drive power supply into positive and negative biases (or positive and negative voltages) to apply them to corresponding one of the plurality of FETs in accordance with the control signal from the phase control circuit. The sequence circuit detects an operational state of the DC/DC converter and outputs a drive signal for operating the relay circuit and the power factor improvement circuit at a time point when it is confirmed that the plurality of FETs of the DC/DC converter have started normal operation under control by the phase control circuit. The relay circuit and the power factor improvement circuit are turned on in accordance with the drive signal from the sequence circuit. In this manner, it is possible to maintain a stable OFF state when the FET is turned off by a single power supply without a negative power supply that has been necessary for turning off the FET in the conventional structure, so as to prevent complication of the circuit and to achieve lower cost and smaller size of the circuit.

DESCRIPTION OF EMBODIMENTS

Embodiment 1

A DC power supply device and a power conversion method according to Embodiment 1 of the present invention are described below in detail with reference to the drawings. Note that, this embodiment does not limit the present invention.

The present invention relates to a DC power supply device and a power conversion method for converting an AC power supply into a DC power supply. In particular, the present invention relates to a small loss and high efficiency DC power supply device and power conversion method, in which a DC/DC converter using a wide-bandgap semiconductor made of GaN or SiC as a switching element is used so as to achieve smaller size and lower cost of the circuit. The DC power supply device and the power conversion method according to the present invention are suitable particularly as a DC power supply device and a power conversion method used in a power supply system for a car, a ship, or an airplane.

Figure 1:
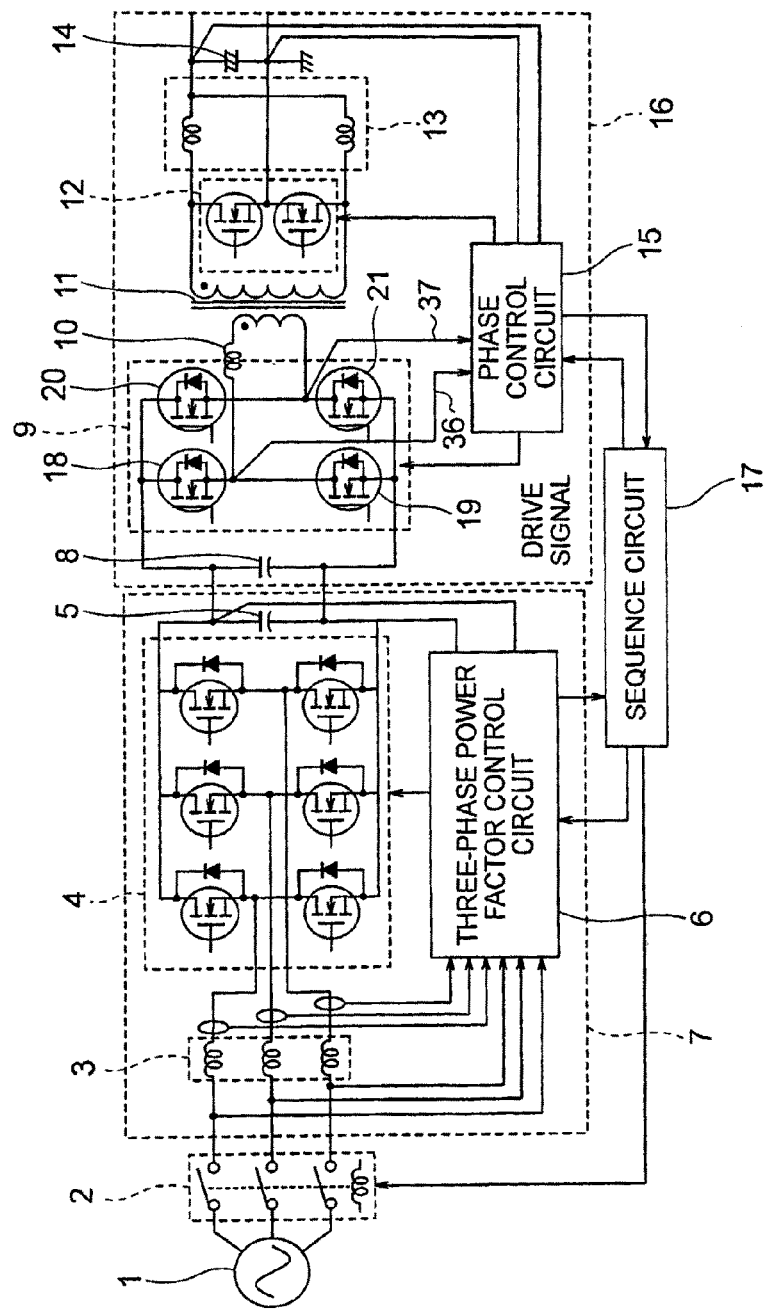
FIG. 1 is a block diagram illustrating a structure of a DC power supply device according to Embodiment 1 of the present invention.
Figure 2:
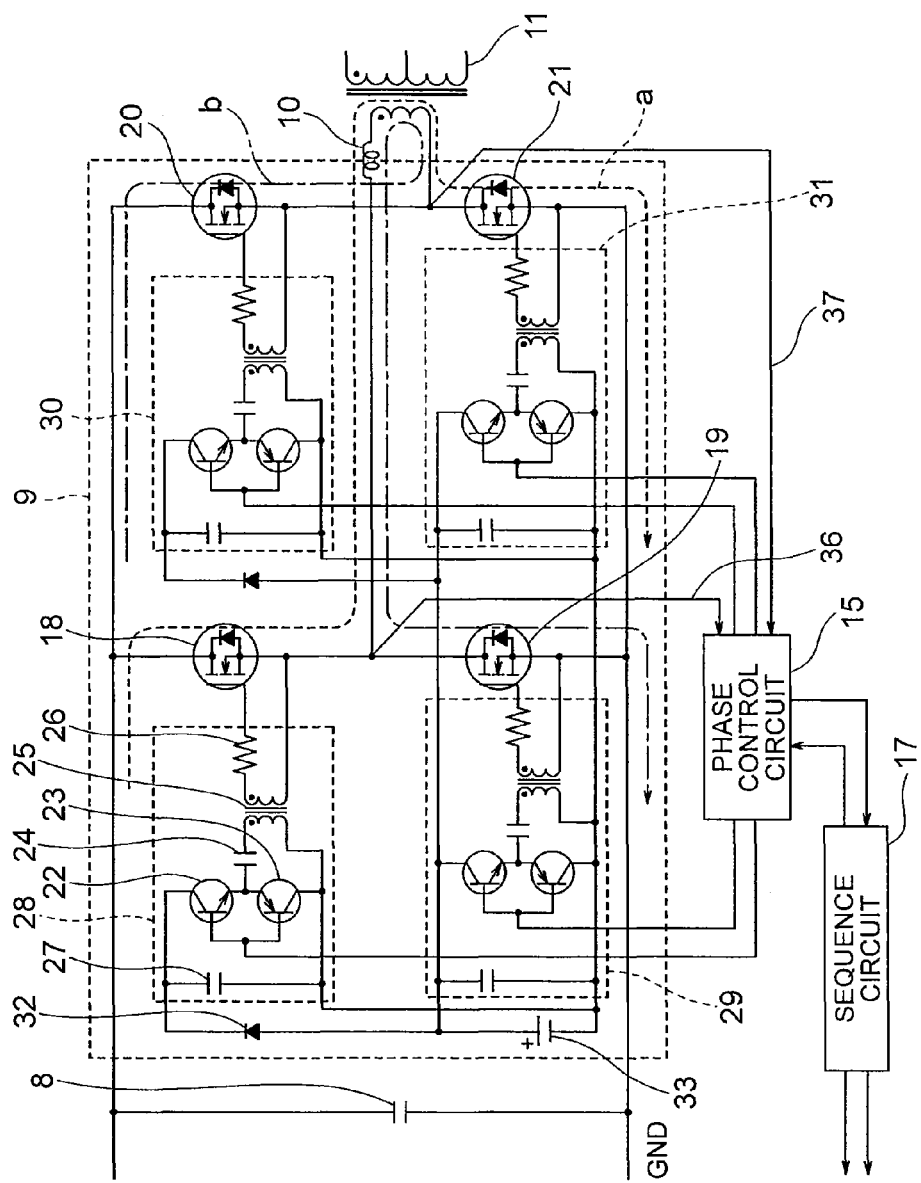
FIG. 2 is a block diagram illustrating a detailed structure of the DC power supply device according to Embodiment 1 of the present invention.
Figure 3:
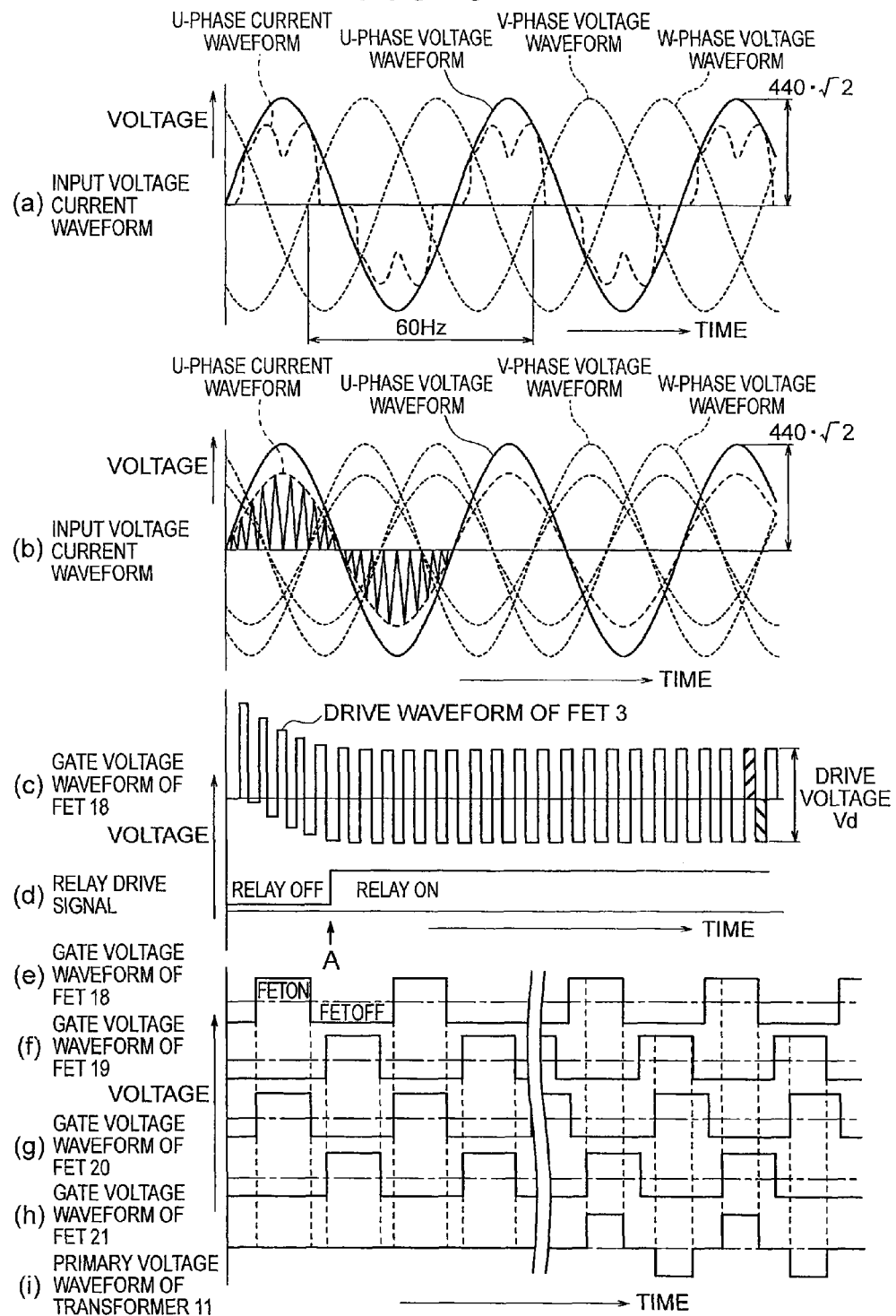
FIGS. 3 are waveform diagrams illustrating an operation of the DC power supply device according to Embodiment 1 of the present invention and a related art DC power supply device.
Figure 4:
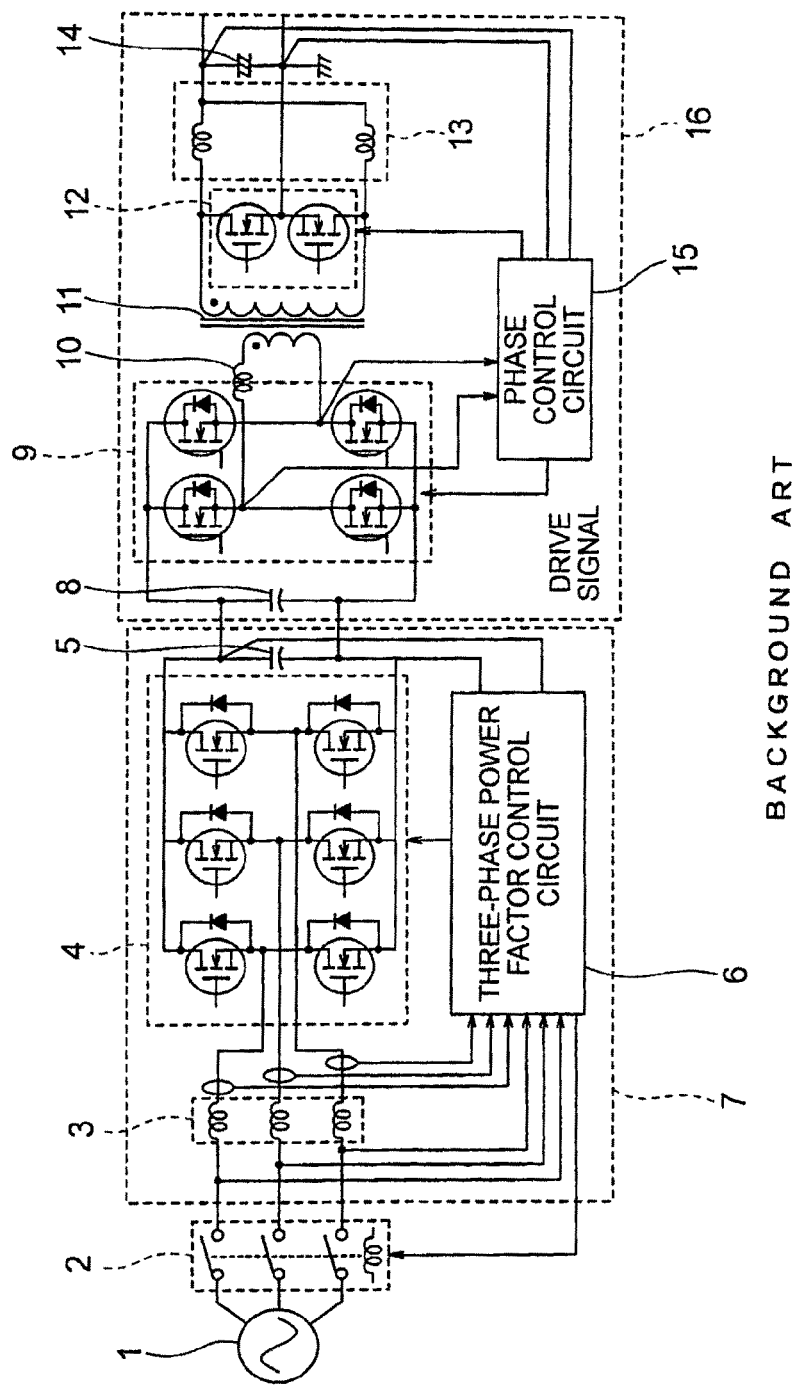
FIG. 4 is a block diagram illustrating an example of the related art DC power supply device to be compared with Embodiment 1 of the present invention.
Figure 5:
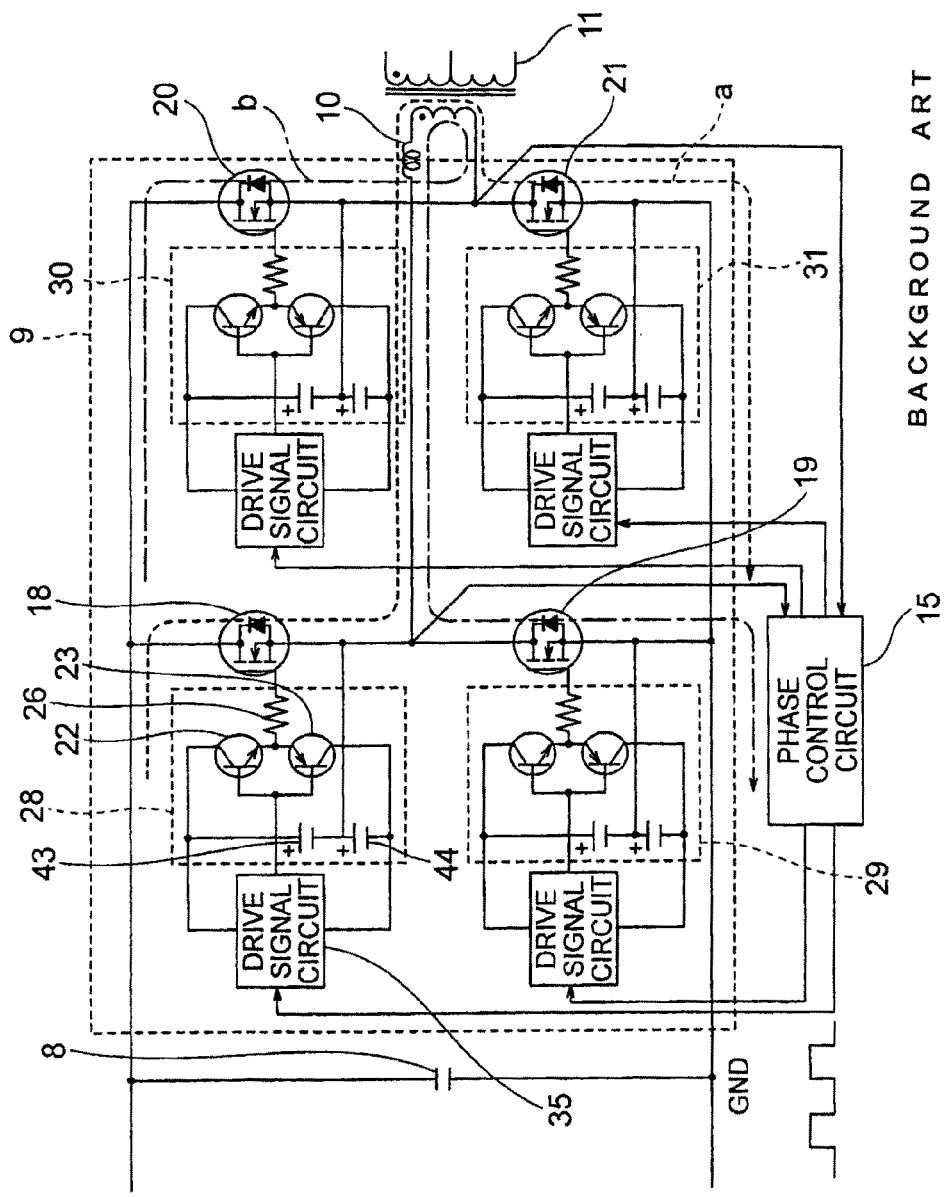
FIG. 5 is a block diagram illustrating a detailed structure of the related art DC power supply device to be compared with Embodiment 1 of the present invention.

FIG. 1 is a block diagram illustrating a structure of the DC power supply device according to an embodiment of the present invention. FIG. 2 is a block diagram illustrating details of the DC power supply device according to the embodiment of the present invention. FIG. 3 are waveform diagrams illustrating an operation of the DC power supply device and the power conversionmethod according to the embodiment of the present invention. FIG. 4 is a block diagram illustrating a structure of the DC power supply device of a comparative example (conventional example) for facilitating understanding of the present invention. FIG. 5 is a block diagram illustrating details of the DC power supply device of the comparative example.

In FIG. 1, a three-phase AC power supply 1 is, for example, a three-phase generator that is used as a primary power supply in a power supply system for a ship or an airplane. The output voltage of the three-phase AC power supply 1 (three-phase generator) is AC 440 Vrms, for example.

The DC power supply device according to this embodiment is used by being connected to the three-phase AC power supply 1, and includes a relay circuit 2, a power factor improvement circuit 7, a DC/DC converter 16, and a sequence circuit 17 as illustrated in FIG. 1.

The relay circuit 2 is a circuit for turning on and off the input from the three-phase AC power supply 1 to the DC power supply device of the present invention, and includes three switching elements disposed for phases U, V, and W of the three-phase AC power supply. The relay circuit 2 is turned on when an input voltage and an internal circuit of the DC power supply device are normal, while the relay circuit 2 is turned off when at least one of the input voltage or the internal circuit of the DC power supply device is abnormal. The relay circuit 2 is disposed for protecting FETs which are connected in series to the DC/DC converter 16 from breakdown caused by excessive short circuit current flowing continuously therethrough when the DC/DC converter 16 starts to operate, for example, even if the FETs cause an arm short circuit. In this case, an input voltage of the DC/DC converter 16 is approximately DC 800 Vrms.

The power factor improvement circuit 7 improves a power factor of the AC voltage, performs full-wave rectification, steps up the AC voltage, and converts the AC voltage into a DC voltage. The power factor improvement circuit 7 includes a choke coil 3 (first choke coil), a switching element 4 (three-phase bridge circuit), a smoothing capacitor 5, and a three-phase power factor control circuit 6 as illustrated in FIG. 1. The choke coil 3 is connected to the relay circuit 2. The choke coil 3 includes three coils corresponding to the phases U, V, and W of the three-phase AC power supply 1. In addition, the switching element 4 disposed in the latter stage of the choke coil 3 includes a total of six FETs arranged to form the three-phase bridge.

The three-phase power factor control circuit 6 is configured to detect the AC voltage and the AC current supplied to the switching element 4 via the choke coil 3, to simultaneously perform, after dq conversion of the AC voltage and the AC current, calculation for power factor compensation control and current control as well as calculation for voltage control based on the output voltage from the switching element 4 to the DC/DC converter 16, and to determine an ON/OFF ratio of each FET of the switching element 4. In this way, the switching element 4 directly performs high speed switching of the three-phase AC voltage at a switching frequency of the ON/OFF ratio controlled in synchronization with the three-phase AC voltage. Therefore, current having the same phase as the input voltage waveform is controlled to flow in a sine wave manner, and the three-phase full-wave rectification and the power factor improvement of the three-phase utilizing the step-up operation are performed simultaneously.

In addition, as illustrated in FIG. 1, the DC/DC converter 16 includes an input capacitor 8, a full bridge circuit 9 including four FETs 18 to 21, a resonance choke coil 10, a switching transformer 11, a rectification FET 12 including two FETs, a choke coil 13 (second choke coil) including two coils, an output capacitor 14, and a phase control circuit 15.

The DC/DC converter 16 converts the DC voltage obtained after the full-wave rectification by the power factor improvement circuit 7 into a low DC voltage so as to supply the low DC voltage to a load. Specifically, the DC/DC converter 16 is a phase shift full-bridge type DC/DC converter including the four FETs 18 to 21 and transmits power to the load by turning on and off the FETs 18 to 21 alternately with changing phases thereof.

In the full bridge circuit 9, each two of the four FETs 18 to 21 made of a wide-bandgap semiconductor are connected in series like a full bridge. The FETs 18 to 21 are connected to a primary winding of the switching transformer 11 in an X shape. In this case, the FETs 18 to 21 are turned on and off alternately while changing phases thereof under control by the phase control circuit 15. Thus, a voltage is applied to the primary side of the switching transformer 11, and a voltage and current corresponding to a winding ratio are generated in a secondary side of the switching transformer 11. In this state, power is transmitted to the load.

The resonance choke coil 10 is a coil for resonance connected in series to the primary side of the switching transformer 11, which delays current flowing when the FETs 18 to 21 are switched, and shifts timing of voltages and currents of the FETs 18 to 21 to reduce a switching loss, so as to realize soft switching.

The rectification FET 12 is a synchronous rectification circuit, which is turned on and off in synchronization with the FETs 18 to 21 of the full bridge circuit 9 operating on the primary side of the switching transformer 11 so as to rectify the output at a low on-voltage, and realizes power conversion with high efficiency.

The choke coil 13 (second choke coil) is connected to the rectification FET 12, and two coils are disposed corresponding to the FETs of the rectification FET 12. The output capacitor 14 is connected to the latter stage of the choke coil 13 (second choke coil).

The phase control circuit 15 determines whether operation of the DC/DC converter 16 is normal or abnormal based on a voltage signal 36 monitored at the node between the FETs 18 and 19 as well as a voltage signal 37 monitored at the node between the FETs 20 and 21. Specifically, an upper limit threshold value and a lower limit threshold value are determined in advance for the voltage signals 36 and 37. If a voltage value detected based on the monitored voltage signals 36 and 37 is the lower limit threshold value or higher and the upper limit threshold value or lower, it is determined to be normal. Otherwise, it is determined to be abnormal. When determining to be abnormal, the phase control circuit 15 promptly outputs a signal to the sequence circuit 17 for turning off the relay circuit 2 and the power factor improvement circuit 7.

In addition, the sequence circuit 17 is connected to the DC/DC converter 16, the relay circuit 2, and the power factor improvement circuit 7, so as to check an operational state of the DC/DC converter 16 via the phase control circuit 15 in the power factor improvement circuit 7. When the operational state changes into astable normal state, the sequence circuit 17 outputs a drive signal for operating the relay circuit 2 and the power factor improvement circuit 7.

FIG. 2 is a diagram illustrating details of the full bridge circuit 9 of the DC/DC converter 16 illustrated in FIG. 1. In FIG. 2, the same component as that in FIG. 1 is denoted by the same numeral or symbol. As illustrated in FIG. 2, in the full bridge circuit 9, FET driving circuits 28, 29, 30, and 31 are connected to the FETs 18 to 21, respectively, and thus the FETs 18 to 21 are driven.

Among these four FET driving circuits 28 to 31, the FET driving circuit 28 is a circuit for driving the FET 18. The FET driving circuit 28 includes a capacitor 27 as an energy bank in which charge is accumulated, NPN and PNP transistors 22 and 23 connected in a totem pole manner for amplifying the drive signal from the phase control circuit 15, a DC cut capacitor 24, a drive transformer 25, and a current limiting resistor 26.

An operation of the FET driving circuit 28 is described below.

In the FET driving circuit 28, a signal output from emitters of the two transistors 22 and 23 connected in series is connected to the drive transformer 25 via the DC cut capacitor 24, and an output of the drive transformer 25 is connected to the gate of the FET 18 via the current limiting resistor 26.

In this case, if the drive signal from the phase control circuit 15 becomes high level, for example, the NPN transistor 22 is turned on so that the voltage of the capacitor 27 is applied to the gate of the FET 18 via the drive transformer 25. Then, the gate of the FET 18 becomes a positive bias to be turned on. At the same time, charge is accumulated in the DC cut capacitor 24.

Next, when the drive signal from the phase control circuit 15 becomes low level, the NPN transistor 22 is turned off and simultaneously the PNP transistor 23 is turned on. Then, the charge stored in the DC cut capacitor 24 is discharged while a voltage opposite to that in the above description is applied to the drive transformer 25. Therefore, the gate of the FET 18 becomes a negative bias to be turned off.

In this way, in accordance with ON/OFF of the drive signal from the phase control circuit 15, the voltage on the primary side of the drive transformer 25 is changed to both the positive and negative sides. Thus, positive and negative voltages in proportion to an ON/OFF ratio of the drive signal are also generated on the secondary side of the drive transformer 25, and the voltage is applied to the gate of the FET 18. Thus, the FET 18 repeats on and off alternately.

The FET driving circuit 29 has quite the same structure as the FET driving circuit 28, and is a circuit for driving the FET 19. Similarly, the FET driving circuit 30 is a circuit for driving the FET 20, and the FET driving circuit 31 is a circuit for driving the FET 21. The FET driving circuits 30 and 31 also have quite the same structure as the FET driving circuit 28, and hence description of the FET driving circuits 29 to 31 are omitted here.

In addition, in this embodiment, only one drive power supply 33 is disposed in common to the FET driving circuits 28 to 31 as illustrated in FIG. 2. In this embodiment, both the positive and negative voltages are applied to the four FETs 18 to 21 only by the single drive power supply 33, and hence the FETs 18 to 21 are operated in accordance with an instruction of the phase control circuit 15 safely while preventing breakdown due to the arm short circuit of the FETs or abnormality of the circuit. In addition, the capacitor 27 of the driving circuit 28 is connected to a back flow preventing diode 32. The back flow preventing diode 32 is a diode for compensating for charge of the capacitor 27 consumed when the FET 18 is turned on by the drive power supply 33 so as to prevent back-flow.

The sequence circuit 17 is a circuit for checking the operational state of the DC/DC converter 16 via the phase control circuit 15 as described above so as to control the DC power supply device to normally operate. Therefore, when the DC power supply device is started, the sequence circuit 17 sends the drive signal to the relay circuit 2 and the power factor improvement circuit 7 so as to control the DC power supply device to normally operate at a time point when it is confirmed that the FET driving circuits 28 to 31 can normally drive the FETs 18 to 21 based on the signal from the phase control circuit 15. In addition, when an abnormality occurs, the sequence circuit 17 stops to send the drive signal to the relay circuit 2 and the power factor improvement circuit 7 in accordance with the signal from the phase control circuit 15 so that the relay circuit 2 and the power factor improvement circuit 7 are turned off.

Here, operation of the sequence circuit 17, the phase control circuit 15, and the FETs 18 to 21 is described with reference to not only FIG. 2 but also the waveform diagrams of FIG. 3 for easy understanding.

FIG. 3(*a*) illustrates input voltage waveforms of individual phases and a U-phase current waveform from the three-phase AC power supply 1 in a case where the full-wave rectification is performed by only the diode bridge structure without switching operation by the six FETs of the switching element 4 included in the three-phase bridge. FIG. 3(*a*) illustrates that, when the full-wave rectification is performed only by diodes, a current waveform is like a deformed sine wave because of generated harmonic ripple current.

FIG. 3(*b*) illustrates the input voltage waveforms of individual phases and the U-phase current waveform in a case where the six FETs of the switching element 4 included in the three-phase bridge are turned on and off so that the power factor improvement is performed.

FIGS. 3(*c*) and 3(*d*) illustrate a voltage waveform of the gate of the FET 18 and a voltage waveform of a drive voltage for driving the relay circuit 2 before and after the gate waveform becomes steady state in the structure of Embodiment 1 illustrated in FIG. 1 and FIG. 2.

FIG. 3(*e*) illustrates a gate voltage waveform of the FET 18 in the structure illustrated in FIG. 2.

FIG. 3(*f*) illustrates a gate voltage waveform to the FET 19 in the structure illustrated in FIG. 2.

FIG. 3(*g*) illustrates a gate voltage waveform to the FET 20 in the structure illustrated in FIG. 2.

FIG. 3(*h*) illustrates a gate voltage waveform to the FET 21 in the structure illustrated in FIG. 2.

FIG. 3(i) illustrates a voltage waveform applied to the primary side of the switching transformer 11 by the operation of the FETs 18 to 21.

As described above, FIG. 3 illustrate the voltage waveforms of individual phases output from the three-phase AC power supply 1, the current waveforms by the full-wave rectification circuit, the drive signal waveform to the relay circuit 2, the voltage waveforms applied to the gates of the FETs 18 to 21 of the DC/DC converter 16, and the voltage waveform applied to the primary side of the switching transformer 11. Among the voltage waveforms of individual phases output from the three-phase AC power supply 1 illustrated in FIG. 3(a), the U-phase voltage waveform is indicated by a solid line, and a V-phase voltage waveform and a W-phase voltage waveform are indicated by fine dotted lines. The U-phase current waveform is indicated by a rough dotted line. The current waveforms by the full-wave rectification circuit of FIG. 3(b) are illustrated as waveforms having the same change as the voltage waveforms without inversion of polarity in a negative half period in order to be associated with the voltage waveform, and are illustrated as the U-phase voltage waveform, the V-phase voltage waveform, and the W-phase voltage waveform. Further, the U-phase voltage waveform is indicated by a solid line, and the V-phase voltage waveform and the W-phase voltage waveform are indicated by fine dotted lines. The U-phase current waveform is indicated by a rough dotted line.

In the DC power supply device according to this embodiment, the control signals for controlling phases of on and off of the FETs 18 to 21 connected in a full bridge manner in the DC/DC converter 16 are output from the phase control circuit 15. Because the voltage on the primary side of the drive transformer 25 changes to both the positive and negative sides in accordance with ON/OFF of the control signal from the phase control circuit 15, the positive and negative voltages in proportion to the ON/OFF ratio of the control signal are generated on the secondary side of the drive transformer 25, and the voltage is applied to the gate of the FET 18. Thus, the FET 18 is turned on and off alternately. This state is illustrated in a part before timing A in FIG. 3(c). Next, the sequence circuit 17 monitors the voltage signals 36 and 37 via the phase control circuit 15 so as to detect drive states of the FETs 18 to 21. Based on a result of the detection, the sequence circuit 17 outputs drive signals for starting the power factor improvement circuit 7 and the relay circuit 2 at a time point when it is confirmed that the FETs 18 to 21 have started normal operation, namely at the timing A, under control by the control signal from the phase control circuit 15. In FIG. 3(d), the drive signal to the relay circuit 2 is changed from off to on at the timing A, and it is understood that the sequence circuit 17 starts to output the drive signal to the relay circuit 2 at the timing A. In addition, when the relay circuit 2 and the power factor improvement circuit 7 are started by the drive signal, input from the three-phase AC power supply 1 is started. The power factor improvement circuit 7 performs the full-wave rectification of the AC voltage input from the three-phase AC power supply 1 while improving the power factor thereof, so as to convert the AC voltage into the DC voltage. In addition, the DC/DC converter 16 converts the DC voltage obtained after the full-wave rectification into the low DC voltage to be supplied to the load.

Further, at the timing A, the gate voltage waveforms of the FETs 18 to 21 are as left halves of waveforms of FIGS. 3(e), 3(f), 3(g), 3(h), and 3(i). Therefore, after the timing A, the sequence circuit 17 sends a signal to the phase control circuit 15 for delaying (shifting) phases of the drive signals for the FET 18 and the FET 19. Thus, the phases of the FETs 18 and 19 are gradually delayed and finally become as right halves of the waveforms of FIGS. 3(e), 3(f), 3(g), 3(h), and 3(i). Thus, after the power factor improvement circuit 7 is started, the control is performed so that phases of the drive signals for the FET 18 and the FET 19 are gradually delayed, on-timing of the FET 18 and on-timing of the FET 21 start to overlap with each other, and on-timing of the FET 20 and on-timing of the FET 19 start to overlap with each other. At this time point, power is sent to the secondary side of the switching transformer 11 for the first time, and hence the DC power supply device starts to function.

Further, a shift amount for delaying (shifting) the phases is set in advance and is increased at a certain rate with time (in proportion to time). When the shift amount reaches a target value, the process of delaying (shifting) the phases is finished. The states when the process is started correspond to the left halves of the waveforms of FIGS. 3(e), 3(f), 3(g), 3(h), and 3(i). The states when the process is finished correspond to the right halves of the waveforms of FIGS. 3(e), 3(f), 3(g), 3(h), and 3(i).

FIG. 4 illustrates a comparative example (conventional example) to be compared with FIG. 1 illustrating the present invention. FIG. 4 is different from FIG. 1 in that the sequence circuit 17 illustrated in FIG. 1 is not disposed. In addition, FIG. 5 illustrates the comparative example (conventional example) to be compared with FIG. 1 illustrating the present invention. FIG. 5 is different from FIG. 2 in that the drive transformer 25, the capacitor 27, the drive power supply 33, and the back flow preventing diode 32 illustrated in FIG. 2 are not disposed, positive and negative drive power supplies 43 and 44 are disposed in each of the FET driving circuits 28 to 31, and the FETs 18 to 21 are driven by using the drive power supplies 43 and 44. In addition, another difference is in that a drive signal circuit 35 connected to the phase control circuit 15 is connected to each of the FET driving circuits 28 to 31. Other structures are the same as or equivalent to those of FIG. 1 or FIG. 2.

With reference to the comparative example (conventional example) of FIG. 5, the FET driving circuit 28 in charge of driving the FET 18 is described. A source voltage of the FET 18 connected to a high voltage side of the input voltage is connected to the GND via the switching transformer 11 and the FET 19 in the state where the FET 18 is turned off, and therefore is a potential of the lower voltage side. Then, when the phase control circuit 15 outputs the high level signal, the transistor 22 of the FET driving circuit 28 is turned on so that an output voltage of the drive power supply 43 (first drive power supply (positive drive power supply)) is applied to the gate of the FET 18, and the FET 18 is turned on. When the FET 18 is turned on, the source voltage of the FET 18 becomes substantially the same as the input voltage. Unless the gate voltage is decreased to a predetermined voltage at which the gate can maintain the OFF state and which is lower than the source voltage, the FET 18 cannot maintain the OFF state. Then, when a low level signal is sent from the phase control circuit 15, the transistor 22 is turned off while the transistor 23 is turned on instead. Thus, the gate voltage of the FET 18 is lowered to a voltage on the lower voltage side of the drive power supply 44 (second drive power supply (negative drive power supply)). Because the drive power supply 44 connects the high voltage side to the source of the FET 18, the gate voltage of the FET 18 is lower than the source voltage by the output voltage of the drive power supply 44 so that the FET 18 is turned off. By repeating this operation, the FET 18 operates to be turned on and off in accordance with the signal from the phase control circuit 15. Similarly, the FETs 19 to 21 also repeats on and off in accordance with the signal from the phase control circuit 15.

The phase control circuit 15 outputs signals having phases that are different by 180 degrees to the FET 18 and the FET 19 at a constant duty when the phase control circuit 15 is started, and outputs the same signal having the same phase to the FET 18 and the FET 20, as well as the FET 19 and the FET 21. In this state, the FET 19 and the FET 21 are turned off when the FET 18 is turned on. And also when the FET 20 is turned on, the FET 19 and the FET 21 are turned off. Therefore, no voltage is applied to the switching transformer 11, and hence the DC power supply device is turned off. This state is represented in the left halves of the waveforms of FIGS. 3(*e*), 3(*f*), 3(*g*), 3(*h*), and 3(*i*). Then, the phases of the drive signals for the FET 18 and the FET 19 are gradually delayed after starting, the on-timing of the FET 18 and the on-timing of the FET 21 start to overlap with each other, and the on-timing of the FET 20 and the on-timing of the FET 19 start to overlap with each other. Then, the waveforms become the right halves of the waveforms of FIGS. 3(*e*), 3(*f*), 3(*g*), 3(*h*), and 3(*i*). When both the FET 18 and the FET 21 are turned on, current flows in a direction of a broken line arrow "a" illustrated in FIG. 2 and FIG. 5. When both the FET 20 and the FET 19 are turned on, current flows in a direction of a dotted-dashed line arrow b illustrated in FIG. 2 and FIG. 5. By repeating this operation, the voltage having a waveform of the right half of FIG. 3(*i*) is applied to the primary side of the switching transformer 11.

In the comparative example (conventional example) of FIG. 5, power is transmitted to the secondary side of the switching transformer 11 for the first time at the time point, and hence the DC power supply device starts to function.

In this way, it is necessary in general for driving the MOS FETs made of GaN or SiC to apply a positive voltage and a negative voltage to the gates of the FETs. Therefore, it is necessary to prepare one set of both the positive and negative drive power supplies for each FET (the drive power supplies 43 and 44 illustrated in FIG. 5). In addition, in order to reduce the number of drive power supplies, it is necessary to use a MOS FET or a transistor made of Si that is usually used. However, because the output voltage of the power factor improvement circuit is very high, it is necessary to use an IGBT having high withstand voltage and low switching speed or an FET having high withstand voltage and very high on-resistance. Therefore, it is difficult to realize a smaller size and higher efficiency.

In contrast, this embodiment has the structure illustrated in FIG. 2 as described above, in which each of the FETs 18 to 21 is driven by using the drive transformer 25. Thus, as illustrated in FIG. 3(*c*), all the output voltages of the drive power supply 33 are applied as the positive voltage to the gates of the FETs just after starting, but soon afterward, in accordance with the ON/OFF ratio of the drive signal from the phase control circuit 15, the output voltages of the drive power supply 33 are divided into the positive voltage and the negative voltage to be applied to the gates of the FETs.

In addition, as illustrated in FIG. 3(*d*), the sequence circuit 17 determines the time point at which it is confirmed that the output voltage of the drive power supply 33 is divided into the positive and negative biases and applied to the gate of the FET 18 in this state (time point at which it is confirmed that the ON/OFF operation is normally and stably started) as the timing A at which the sequence circuit 17 outputs the drive signal to the relay circuit 2 and the power factor improvement circuit 7. Thus, at the timing A, the sequence circuit 17 outputs the drive signal for turning on the relay circuit 2 and the power factor improvement circuit 7, and the relay circuit 2 and the power factor improvement circuit 7 are operated by the drive signal. Thus, DC 800 V as the input voltage is applied to the DC/DC converter 16. FIG. 3(*d*) illustrates a waveform of the drive signal from the sequence circuit 17 for driving the relay circuit 2. FIG. 3(*d*) illustrates that the drive signal for the relay circuit 2 is switched from OFF to ON at the timing A.

Further, at the timing A, the waveforms are as the left halves of waveforms of FIGS. 3(*e*), 3(*f*), 3(*g*), 3(*h*), and 3(*i*). Therefore, after the timing A, the sequence circuit 17 sends a signal to the phase control circuit 15 for delaying phases of the drive signals for the FET 18 and the FET 19. Thus, the phases of the FETs 18 and 19 are gradually delayed and become as the right halves of the waveforms of FIGS. 3(*e*), 3(*f*), 3(*g*), 3(*h*), and 3(*i*). In other words, control is performed as follows. After the power factor improvement circuit 7 is started, the phases of the drive signals for the FET 18 and the FET 19 are gradually delayed, the on-timing of the FET 18 and the on-timing of the FET 21 start to overlap with each other, and the on-timing of the FET 20 and the on-timing of the FET 19 start to overlap with each other. At this time point, power is transmitted to the secondary side of the switching transformer 11 for the first time so that the DC power supply device starts to function.

Further, the sequence circuit 17 determines the time point to output the drive signal to the relay circuit 2 and the power factor improvement circuit 7, namely the timing A as follows. As illustrated in FIG. 3(*c*), in accordance with the ON/OFF ratio of the drive signal from the phase control circuit 15, the state where the output voltage of the drive power supply 33 is divided into the positive voltage and the negative voltage and are applied to the gates of the FETs 18 to 21 is monitored by the voltage signals 36 and 37 via the phase control circuit 15, and the time point at which absolute values of the magnitude of the positive and negative voltages applied to the gates of the FETs 18 to 21 become the same is determined as the time point (timing) to output the drive signal.

In addition, if the operation of the power factor improvement circuit 7 becomes abnormal, the three-phase power factor control circuit 6 detects the abnormality of the output voltage and outputs a signal for turning off the relay circuit 2 to the sequence circuit 17, so as to stop the signal from the phase control circuit 15. In addition, if the driving circuits 28 to 31 are broken down to cause abnormality of the operation of the FETs 18 to 21, the phase control circuit 15 determines the abnormality based on the voltage signal 36 monitored at the intermediate node between the FETs 18 and 19 and/or the voltage signal 37 monitored at the intermediate node between the FETs 20 and 21. Then, the phase control circuit 15 promptly outputs a signal for turning off the relay circuit 2 and the power factor improvement circuit 7 to the sequence circuit 17, so as to turn off the relay circuit 2 and the power factor improvement circuit 7. By this operation, also when the operations of the power factor improvement circuit 7, the driving circuits 28 to 31, and the FETs 18 to 21 become abnormal, it is possible to operate to prevent breakdown due to the arm short circuit of the FETs in each circuit or an abnormality of the circuit.

In this way, with the structure illustrated in FIG. 1 and FIG. 2, both the positive and negative voltages can be applied to the four FETs 18 to 21 only by the single drive power supply 33, so as to operate the FETs 18 to 21 safely in accordance with the instruction of the phase control circuit 15.

As described above, the DC power supply device of the present invention includes the power factor improvement circuit 7 for converting the AC voltage from the three-phase AC power supply 1 into the DC voltage by performing the full-wave rectification while improving the power factor thereof, the DC/DC converter 16 for converting the DC voltage from the power factor improvement circuit 7 into the low DC voltage to be supplied to the load, the relay circuit 2 disposed between the three-phase AC power supply 1 and the power factor improvement circuit 7 so as to switch between on and off of the input from the three-phase AC power supply 1, and the sequence circuit 17 connected to the power factor improvement circuit 7, the DC/DC converter 16, and the relay circuit 2. The DC/DC converter 16 includes the plurality of FETs 18 to 21 connected to form a full bridge, the FET driving circuits 28 to 31 respectively connected to the FETs 18 to 21 so as to drive the FETs 18 to 21, the single drive power supply 33 connected in common to all the FET driving circuits 28 to 31, and the phase control circuit 15 for supplying the control signal for controlling on and off phases of the FETs 18 to 21 to the FET driving circuits 28 to 31. The FET driving circuits 28 to 31 divide the output voltages from the drive power supply 33 into the positive and negative biases to be applied to the FETs 18 to 21 in accordance with the control signal from the phase control circuit 15. Specifically, the FET driving circuits 28 to 31 each include the drive transformer 25. The drive transformer 25 changes the voltage on the primary side to both the positive and negative sides in accordance with ON/OFF of the control signal from the phase control circuit 15. Thus, the positive and negative voltages in proportion to the ON/OFF ratio of the drive signal are generated on the secondary side, and the voltages are applied to the gates of the FETs 18 to 21. The sequence circuit 17 detects the operational state of the DC/DC converter 16 and outputs the drive signal for operating the relay circuit 2 and the power factor improvement circuit 7 at the time point when it is confirmed that the FETs 18 to 21 of the DC/DC converter 16 have started normal operation under control by the phase control circuit 15. Because the relay circuit 2 and the power factor improvement circuit 7 of the DC power supply device are turned on in accordance with the drive signal from the sequence circuit 17, the negative power supply for turning off the FET, which has been necessary in the conventional structure, is not necessary. Both the positive and negative voltages are applied to the four FETs 18 to 21 only by the single drive power supply 33. Therefore, it is possible to constitute the DC power supply device capable of driving, by the single drive power supply, the switching device made of GaN or SiC, which has very low on-resistance, high withstand voltage, large current, and is capable of high speed switching. Thus, it is possible to realize the DC power supply device at low cost, which can prevent the circuit from being complicated, and has small size, high efficiency, and small loss.

Industrial Applicability

As described above, the DC power supply device according to the present invention is useful as a DC power supply device that can be realized with low cost and small size, and capable of performing conversion for the DC power supply with high efficiency. In particular, the DC power supply device according to the present invention is suitable for a DC power supply device used in a power supply system for a car, a ship, or an airplane. Further, the DC power supply device according to the present invention can be used not only in the power supply system for a car, a ship, or an airplane as described above but also in a power supply system for a general apparatus in which an AC power supply is input and converted into a DC power supply for use. It is needless to say that the same effect can be obtained in such a case.

Reference Signs List

1 three-phase AC power supply (three-phase generator), 2 relay circuit, 3 choke coil (first choke coil), 4 switching element, 5 smoothing capacitor, 6 three-phase power factor control circuit, 7 power factor improvement circuit, 8 input capacitor, 9 full bridge circuit, 10 resonance choke coil, 11 switching transformer, 12 rectification FET, 13 choke coil (second choke coil), 14 output capacitor, 15 phase control circuit, 16 DC/DC converter, 17 sequence circuit, 18, 19, 20, 21 wide band gap FET, 22 NPN transistor, 23 PNP transistor, 24 DC cut capacitor, 25 drive transformer, 26 current limiting resistor, 27 capacitor, 28, 29, 30, 31 FET driving circuit, 32 back flow preventing diode, 33 drive power supply, 35 drive signal circuit, 43 drive power supply (first drive power supply), 44 drive power supply (second drive power supply).

The invention claimed is:

1. A DC power supply device, comprising:
   a power factor improvement circuit for converting an AC voltage from an AC power supply into a DC voltage by performing full-wave rectification while improving a power factor;
   a DC/DC converter for converting the DC voltage from the power factor improvement circuit into a low DC voltage to be supplied to a load;
   a relay circuit disposed between the AC power supply and the power factor improvement circuit so as to switch between on and off of an input from the AC power supply; and
   a sequence circuit connected to the power factor improvement circuit, the DC/DC converter, and the relay circuit, wherein:
   the DC/DC converter comprises:
      a plurality of FETs connected to each other to form a full bridge;
      a plurality of FET driving circuits respectively connected to the plurality of FETs, for driving the plurality of FETs;
      a single drive power supply connected in common to all the plurality of FET driving circuits; and
      a phase control circuit for outputting, to the plurality of FET driving circuits, a control signal for controlling on and off phases of the plurality of FETs;
   each of the plurality of FET driving circuits in a normal operation divides an output voltage from the single drive power supply into a positive and negative biases to apply the positive and negative biases to corresponding one of the plurality of FETs in accordance with the control signal from the phase control circuit;
   the sequence circuit detects an operational state of the DC/DC converter and outputs a drive signal for operating the relay circuit and the power factor improvement circuit at a time point when it is confirmed that the plurality of FETs of the DC/DC converter have started the normal operation under control by the phase control circuit; and
   the relay circuit and the power factor improvement circuit are turned on in accordance with the drive signal from the sequence circuit.

2. The DC power supply device according to claim 1, wherein:
   the each of the plurality of FET driving circuits comprises a drive transformer; and
   the drive transformer changes a voltage on a primary side to both positive and negative sides in accordance with ON/OFF of the control signal from the phase control circuit, and thus generates positive and negative voltages on a secondary side in proportion to an ON/OFF ratio of the drive signal so as to apply the positive and negative voltages to a gate of corresponding one of the plurality of FETs.

3. A power conversion method, comprising the steps of:

outputting a control signal for controlling on and off phases of a plurality of FETs connected to each other to form a full bridge;

dividing an output voltage from a single drive power supply into positive and negative biases and applying the positive and negative biases to the plurality of FETs in accordance with the control signal in a normal operation;

detecting a drive state of the plurality of FETs;

outputting a drive signal at a time point when it is confirmed that the plurality of FETs have started the normal operation under control by the control signal based on a result of the detecting;

converting an AC voltage from an AC power supply into a DC voltage by performing full-wave rectification while improving a power factor in accordance with the drive signal; and converting the DC voltage obtained after the full-wave rectification into a low DC voltage to be supplied to a load.

* * * * *